United States Patent
Adragna

(10) Patent No.: US 12,040,722 B2
(45) Date of Patent: Jul. 16, 2024

(54) SYNCHRONOUS RECTIFIER CONTROL CIRCUIT AND METHOD

(71) Applicant: STMicroelectronics S.r.l., Agrate Brianza (IT)

(72) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 252 days.

(21) Appl. No.: 17/523,561

(22) Filed: Nov. 10, 2021

(65) Prior Publication Data

US 2023/0143391 A1    May 11, 2023

(51) Int. Cl.
  *H02M 3/335* (2006.01)
  *H02M 1/08* (2006.01)

(52) U.S. Cl.
  CPC ......... *H02M 3/33592* (2013.01); *H02M 1/08* (2013.01)

(58) Field of Classification Search
  CPC .. H02M 3/33592; H02M 1/08; H02M 1/0048; H02M 1/0058; H02M 3/33507
  See application file for complete search history.

(56) References Cited

U.S. PATENT DOCUMENTS

| | | |
|---|---|---|
| 9,614,447 B2 | 4/2017 | Liu |
| 9,954,456 B2 | 4/2018 | Xue et al. |
| 9,991,811 B1 | 6/2018 | Song et al. |
| 10,044,283 B2 | 8/2018 | Deng |
| 10,097,100 B1* | 10/2018 | Xue ........................ H02M 1/083 |
| 10,186,976 B2 | 1/2019 | Duvnjak |
| 10,333,417 B2 | 6/2019 | Song et al. |
| 10,333,418 B2 | 6/2019 | Song et al. |
| 10,523,127 B1 | 12/2019 | Xue et al. |
| 10,790,753 B2* | 9/2020 | Koo ........................ H02M 3/3353 |
| 2014/0204625 A1 | 7/2014 | Liu et al. |
| 2018/0358885 A1* | 12/2018 | Tao .......................... H02M 1/08 |
| 2019/0229634 A1* | 7/2019 | Moon ............... H02M 3/33592 |

FOREIGN PATENT DOCUMENTS

| | | |
|---|---|---|
| CN | 110545041 A | 12/2019 |
| CN | 113410994 A | 9/2021 |
| WO | 2021042812 A1 | 3/2021 |

OTHER PUBLICATIONS

Liu, P., "Comparison of GaN- and Silicon FET-Based Active Clamp Flyback Converters," Power Supply Design Seminar, Texas Instruments, SLUP380, 2018, 22 pages.

* cited by examiner

*Primary Examiner* — Kyle J Moody
(74) *Attorney, Agent, or Firm* — Slater Matsil, LLP

(57) ABSTRACT

In an embodiment, a method for controlling a synchronous rectifier (SR) transistor of a flyback converter includes: determining a first voltage across conduction terminals of the SR transistor; asserting a turn-on signal when a body diode of the SR transistor is conducting current; asserting a turn-off signal when current flowing through the conduction terminals of the SR transistor decreases below a first threshold; generating a gating signal based on an output voltage of the flyback converter and on the first voltage; turning on the SR transistor based on the turn-on signal and on the gating signal; and turning off the SR transistor based on the turn-off signal.

21 Claims, 12 Drawing Sheets

SYNCHRONOUS RECTIFIER CONTROL CIRCUIT AND METHOD

TECHNICAL FIELD

The present disclosure relates generally to an electronic system and method, and, in particular embodiments, to a synchronous rectifier control circuit and method.

BACKGROUND

There are various topologies of switching converters, including buck, boost, buck-boost, and flyback converters. FIG. 1 shows a schematic diagram of exemplary flyback converter 100. Flyback converter 100 includes transformer 112, resistor 104, capacitors 106 and 114, diodes 108 and 116, transistor 102, and primary controller 110.

During normal operation, primary controller 110 turns on and off in a known manner transistor 102 to cause primary current $I_p$ to flow through primary winding 112a. Primary current $I_p$ induces the flow of secondary current $I_s$ through secondary winding 112b. Diode 116 cooperates with output capacitor 114 to operate as a rectifier so that output voltage $V_{out}$ is a DC voltage (e.g., with a superimposed ripple).

The topology of flyback converter 100 is also known as an RCD clamp flyback converter because converter 100 includes an RCD clamp circuit (formed by elements 104, 106, and 108). The purpose of this RCD clamp circuit is to dissipate that energy taken from the input source in each switching cycle and stored in the primary winding that is not transferred to the secondary winding because of the imperfect coupling between them. This unused energy is commonly referred to as the "leakage inductance energy" because it is assumed that it is stored in a portion of the primary inductance uncoupled to the secondary one called leakage inductance. RCD clamp flyback converters are generally simple and inexpensive circuits.

FIG. 2 shows a schematic diagram of exemplary flyback converter 200. Flyback converter 200 operates in a similar manner as flyback converter 100. Flyback converter 200, however, replaces the RCD clamp of converter 100 with an active clamp formed by transistor 208 and capacitor 106. Thus, the topology of flyback converter 200 is also known as an active clamp flyback (ACF) converter.

Advantages of ACF converters include the recycling of leakage inductance energy to achieve soft-switching (ZVS) for transistors 208 and 102, high efficiency (e.g., greater than 93%) achievable with high switching frequency (e.g., higher than 200 kHz), and smooth waveforms, which may result in low EMI.

SUMMARY

In accordance with an embodiment, a method for controlling a synchronous rectifier (SR) transistor of a flyback converter includes: determining a first voltage across conduction terminals of the SR transistor; asserting a turn-on signal when a body diode of the SR transistor is conducting current; asserting a turn-off signal when current flowing through the conduction terminals of the SR transistor decreases below a first threshold; generating a gating signal based on an output voltage of the flyback converter and on the first voltage; turning on the SR transistor based on the turn-on signal and on the gating signal; and turning off the SR transistor based on the turn-off signal.

In accordance with an embodiment, a synchronous rectifier (SR) controller includes: an output terminal configured to be coupled to a control terminal of an SR transistor of a flyback converter; and an input terminal configured to receive an output voltage of the flyback converter, where the SR controller is configured to: determine a first voltage across conduction terminals of the SR transistor; assert a turn-on signal when a body diode of the SR transistor is conducting current; assert a turn-off signal when current flowing through the conduction terminals of the SR transistor decreases below a first threshold; generate a gating signal based on the output voltage of the flyback converter and on the first voltage; turn on the SR transistor based on the turn-on signal and on the gating signal; and turn off the SR transistor based on the turn-off signal.

In accordance with an embodiment, a flyback converter including: a transformer having first and second windings; an output terminal coupled to the second winding; a first primary transistor coupled to the first winding; a primary controller having an output coupled to a control terminal of the first primary transistor; a synchronous rectifier (SR) transistor coupled to the second winding; and an SR controller configured to: determine a first voltage across conduction terminals of the SR transistor, assert a turn-on signal when a body diode of the SR transistor is conducting current, assert a turn-off signal when current flowing through the conduction terminals of the SR transistor decreases below a first threshold, generate a gating signal based on an output voltage at the output terminal and on the first voltage; turn on the SR transistor based on the turn-on signal and on the gating signal; and turn off the SR transistor based on the turn-off signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., an ACF converter with synchronous rectification for use in applications such as USB-PD type C. Embodiments of the present invention may be used in other types of applications.

In an embodiment of the present invention, an ACF converter operated as a non-complementary ACF converter includes a synchronous rectifier (SR) transistor that turns on during the main conduction interval ($t_A$) of secondary current but not during the minor conduction interval ($t_B$) of secondary current. A gating signal (ON_EN) is generated based on the output voltage of the ACF converter and on the drain-to-source voltage of the SR transistor and prevents the turn on of the SR transistor when the gating signal is asserted (e.g., low).

Figure 3A:
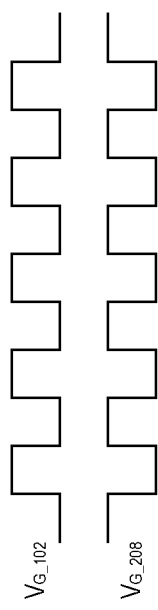
FIGS. 3A and 3B show exemplary waveforms associated with operating the flyback converter of FIG. 2 as a complementary ACF converter.
Figure 3B:
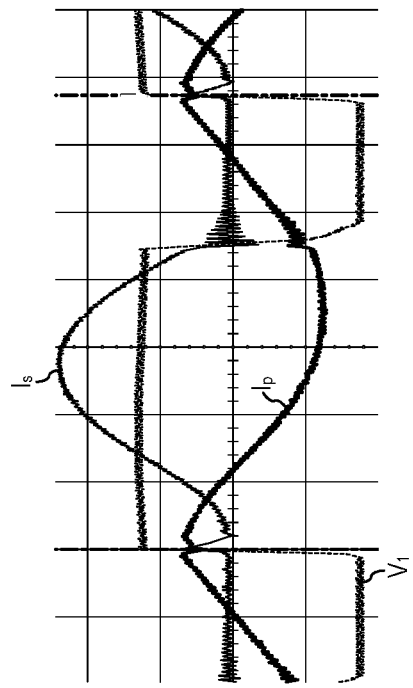

ACF converter 200 may be operated as a complementary ACF converter or as a non-complementary ACF converter. FIGS. 3A and 3B show exemplary waveforms associated with operating converter 200 as a complementary ACF converter.

As shown in FIG. 3A, signals $V_{G\_102}$ and $V_{G\_208}$ driving transistors 102 and 108, respectively, turn on and off in a complementary manner. Thus, transistor 102 is turned on when transistor 208 is turned off, and vice versa. As shown in FIG. 3B, when voltage $V_1$ is high (when transistor 102 is off and transistor 208 is on), the primary current $I_p$ and the secondary current $I_s$ have sinusoidal shapes. When voltage $V_1$ is low (when transistor 102 is on and transistor 208 is off) primary current $I_p$ has a straight-line shape while the secondary current $I_s$ is zero.

Figure 1:
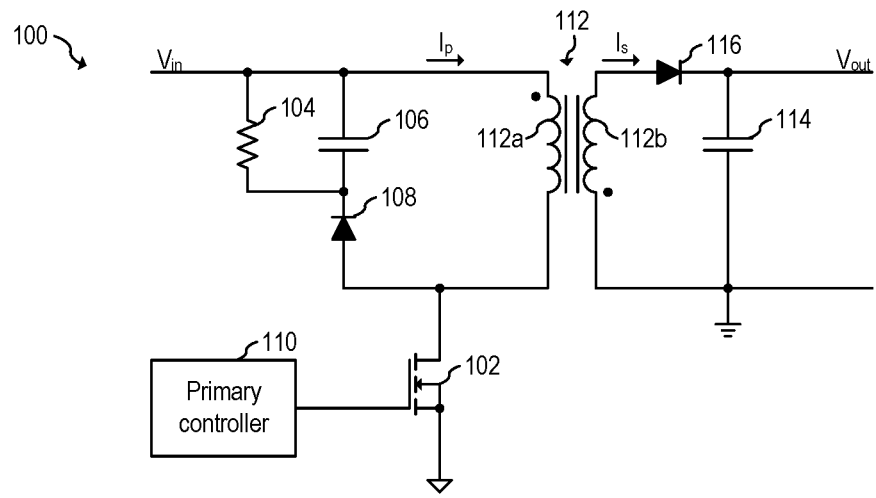
FIGS. 1 and 2 show schematic diagrams of exemplary flyback converters.
Figure 2:
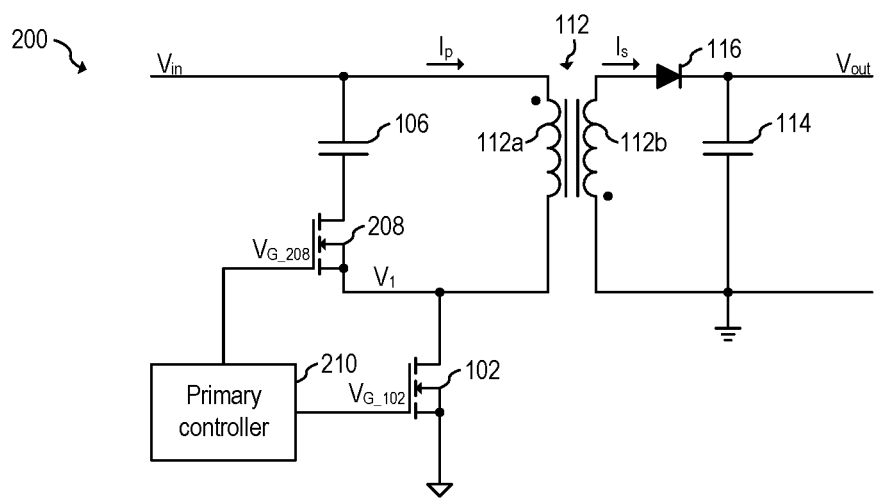
Figure 4A:
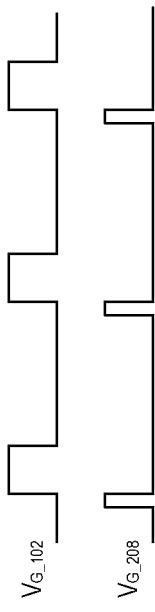
FIGS. 4A and 4B show exemplary waveforms associated with operating the flyback converter of FIG. 2 as a non-complementary ACF converter.
Figure 4B:
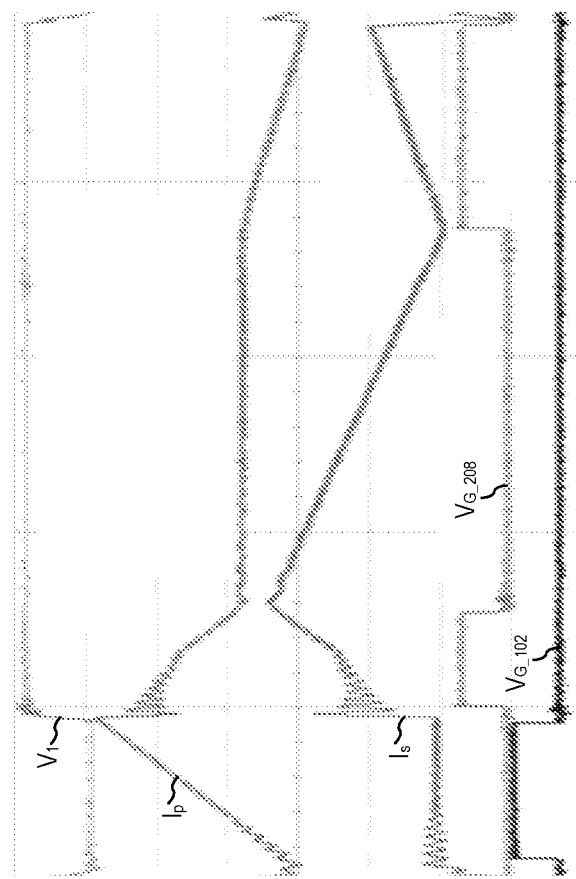

FIGS. 4A and 4B show exemplary waveforms associated with operating converter 200 as a non-complementary ACF converter. As shown in FIGS. 4A and 4B, transistor 208 is turned on after the secondary current $I_s$ demagnetizes for a period of time to allow the primary current $I_p$ to increase enough to achieve soft switching. As a result, there is simultaneous conduction on the primary and secondary side of the ACF converter 200.

Advantages of some embodiments operating ACF converters (e.g., 200) in a non-complementary manner (e.g., as illustrated in FIGS. 4A and 4B) include lower RMS current circulating on the primary side, lower power losses, higher efficiency, easy to manage broad input voltage $V_{in}$ and broad output voltage $V_{out}$ range, which may be particularly advantageous for applications such as USB Power Delivery (USB-PD).

In some embodiments, the rectifying diode 116 is replaced with a transistor that is controlled to emulate diode behavior, which may advantageously achieve reduced power losses and increased efficiency.

Figure 5A:
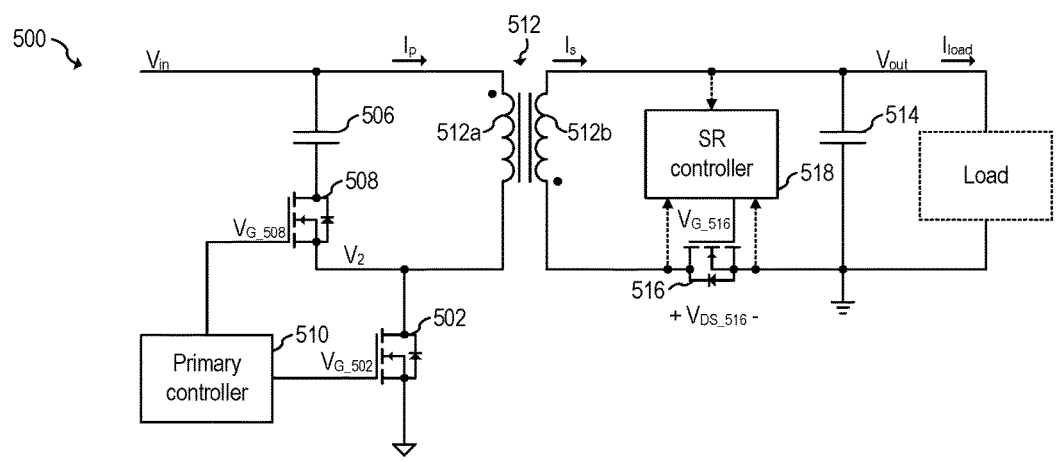
FIGS. 5A and 5B show schematic diagrams of an ACF converter, according to an embodiment of the present invention.

FIG. 5A shows a schematic diagram of ACF converter 500, according to an embodiment of the present invention. ACF converter 500 includes transformer 512, capacitors 506 and 514, transistors 502, 508, and 516, and primary controller 510 and synchronous rectifier (SR) controller 518. Capacitor 506 may be referred to as a clamp capacitor. Transistor 516 may be referred to as a synchronous rectifier (SR) transistor.

Although FIG. 5A illustrate SR transistor 516 disposed on the ground side of secondary winding 512b, in some embodiments, SR transistor 516 may be disposed on the other side of secondary winding 512b.

Transistors 502, 508, and 512 may be implemented, e.g., as metal-oxide semiconductor field-effect transistors (MOSFETs), for example. Other implementations, such as using GaN transistors, are also possible.

In some embodiments, primary controller 510 is configured to operate transistors 508 and 502 in a non-complementary manner, e.g., similar to primary controller 210, e.g., as shown in FIGS. 4A and 4B.

Primary controller 510 may be implemented, e.g., with a general purpose or custom microcontroller or processor, e.g., coupled to a memory and configured to execute instructions stored in the memory. In some embodiments, primary controller 510 may be implemented with logic circuits, such as combinatorial logic, flip-flops, finite state machines, etc. Other implementations are also possible.

As shown in FIG. 5A, SR controller 518 may sense output voltage $V_{out}$ and a drain-to-source voltage $V_{DS\_516}$ for generating voltage $V_{G\_516}$. SR controller 518 may be implemented, e.g., with a general purpose or custom microcontroller or processor, e.g., coupled to a memory and configured to execute instructions stored in the memory. In some embodiments, SR controller 518 may be implemented with logic circuits, such as combinatorial logic, flip-flops, finite state machines, etc. Other implementations are also possible.

Figure 5B:
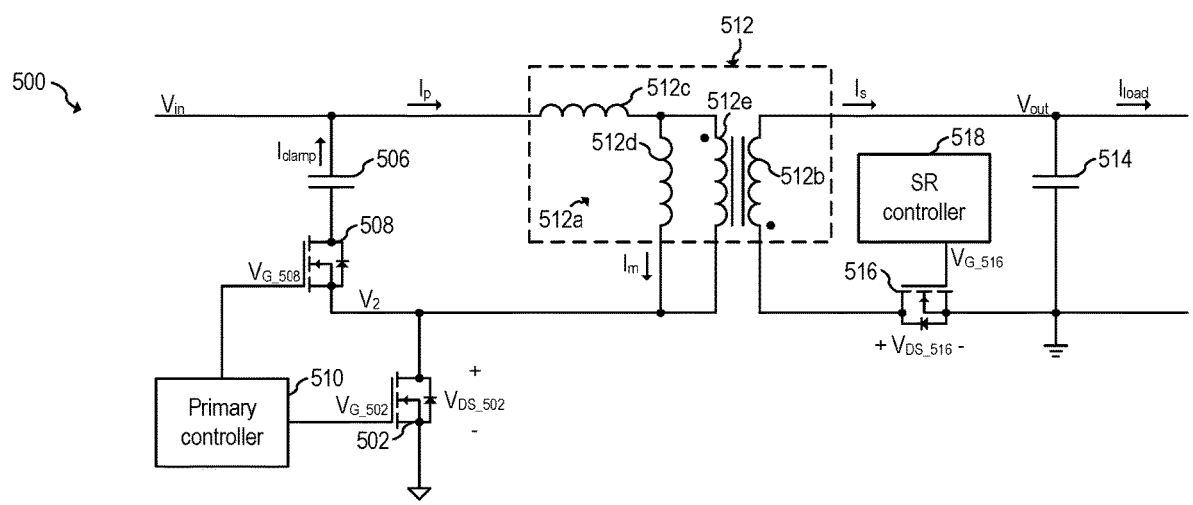

FIG. 5B shows a schematic diagram of ACF converter 500 illustrating a model for the primary winding 512a, according to an embodiment of the present invention. As shown in FIG. 5B, primary winding 512a may be modeled with inductances 512c, 512d, and 512e.

Figure 5C:
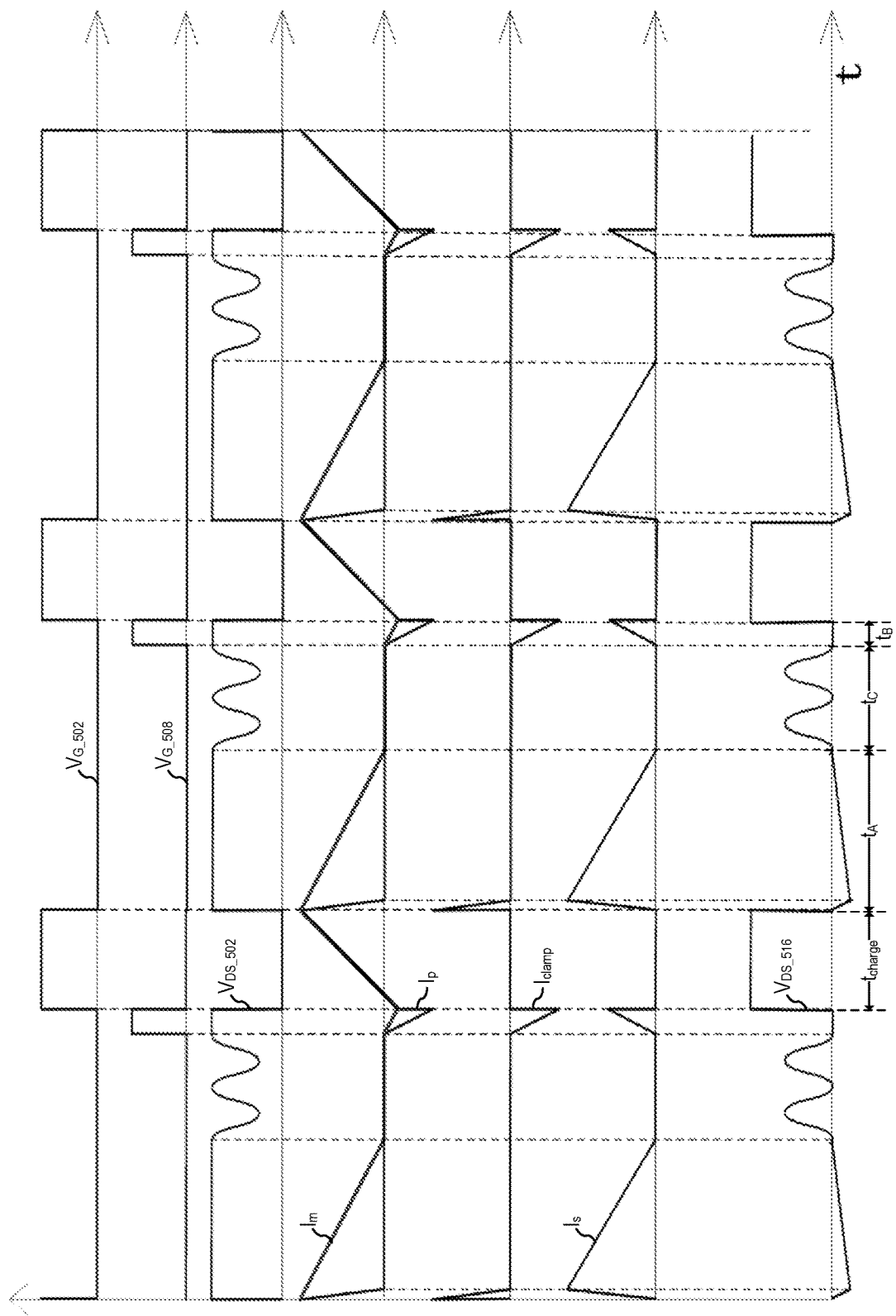
FIG. 5C shows waveforms associated with the ACF converter of FIG. 5A while being operated as a non-complementary ACF converter, according to an embodiment of the present invention.

FIG. 5C shows waveforms associated with ACF converter 500 while being operated as a non-complementary ACF converter, according to an embodiment of the present invention. FIG. 5C may be understood in view of FIG. 5B.

As shown in FIG. 5C, during period $t_{charge}$, transistor 502 is on, transistor 508 is off, and primary current $I_p$ and magnetization current $I_m$ increase. Once transistor 502 is turned off, clamp current $I_{clamp}$ spikes and secondary current $I_s$ increases until primary current $I_p$ drops to zero, and then begins to decrease until magnetization current $I_m$ drops to zero. As shown in FIG. 5C, secondary current $I_s$ is non-zero during period $t_A$.

During period $t_c$, the drain-to-source voltage of transistors 502 ($V_{DS\_502}$) and 516 ($V_{DS\_516}$) resonate until transistor 508 is turned on. Once transistor 508 is turned on, primary current $I_p$, magnetization current $I_m$, and clamp current $I_{clamp}$ begin decreasing below zero, and secondary current $I_s$ begins increasing until transistor 502 is turned on.

As shown in FIG. 5C, during the time in which transistor 502 is off, there are two conduction intervals of secondary current $I_s$ (periods $t_A$ and $t_B$). Conduction interval $t_A$ may be referred to as the main conduction interval. Conduction interval $t_B$ (also referred to as the minor conduction interval) occurs when transistor 508 is turned on to let reverse current ($I_{clamp}$) flow. Thus, during period $t_B$, there is simultaneous conduction in the primary and secondary side of converter 500. Although the current peak of secondary current $I_s$ during period $t_B$ is relatively high and may be comparable to the current peak of secondary current $I_s$ during period $t_A$, the duration of period $t_B$ is shorter than the duration of period $t_A$.

In some embodiments, the time between periods $t_A$ and $t_B$ is approximately zero ($t_c \approx 0$) at full load (max $I_{load}$). As the load decreases (e.g., from max $I_{load}$), period $t_c$ increases, e.g., to reduce switching frequency and increase light load efficiency.

In some embodiments, it is desirable to turn on SR transistor 516 during period $t_A$ but not during period $t_B$. Thus, in some embodiments, secondary current $I_s$ flows through the current path of transistor 516 during period $t_A$ and flows through the body diode of transistor 516 during period $t_B$. By allowing current $I_s$ to flow through the current path of transistor 516 during period $t_A$, some embodiments advantageously reduce conduction losses. In some embodiments, by keeping transistor 516 off during period $t_B$, some embodiments advantageously reduce noise and EMI, allow for a less complex implementation of SR controller 518, and/or advantageously avoid hard switching of transistor 516 (e.g., when turning off transistor 516 at the end of period $t_B$). In some embodiments, such as in some embodiments operating at frequencies higher than 200 kHz, avoiding hard switching of transistor 516 during period $t_B$ may advantageously result in lower power consumption versus turning on transistor 516 during period $t_B$.

Figure 6A:
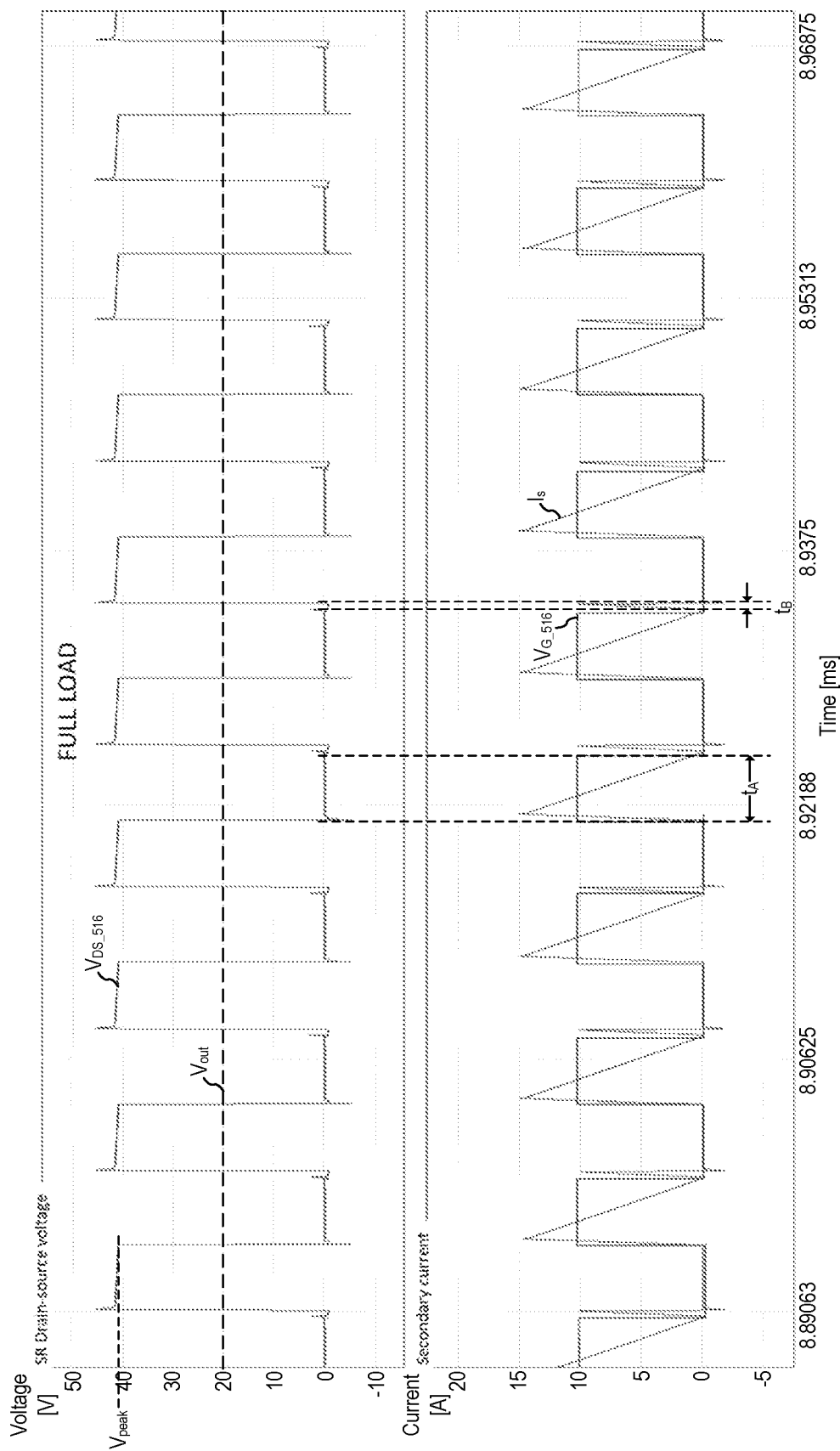
FIGS. 6A and 6B show waveforms associated with the SR transistor of the ACF converter of FIG. 5A, according to an embodiment of the present invention.
Figure 6B:
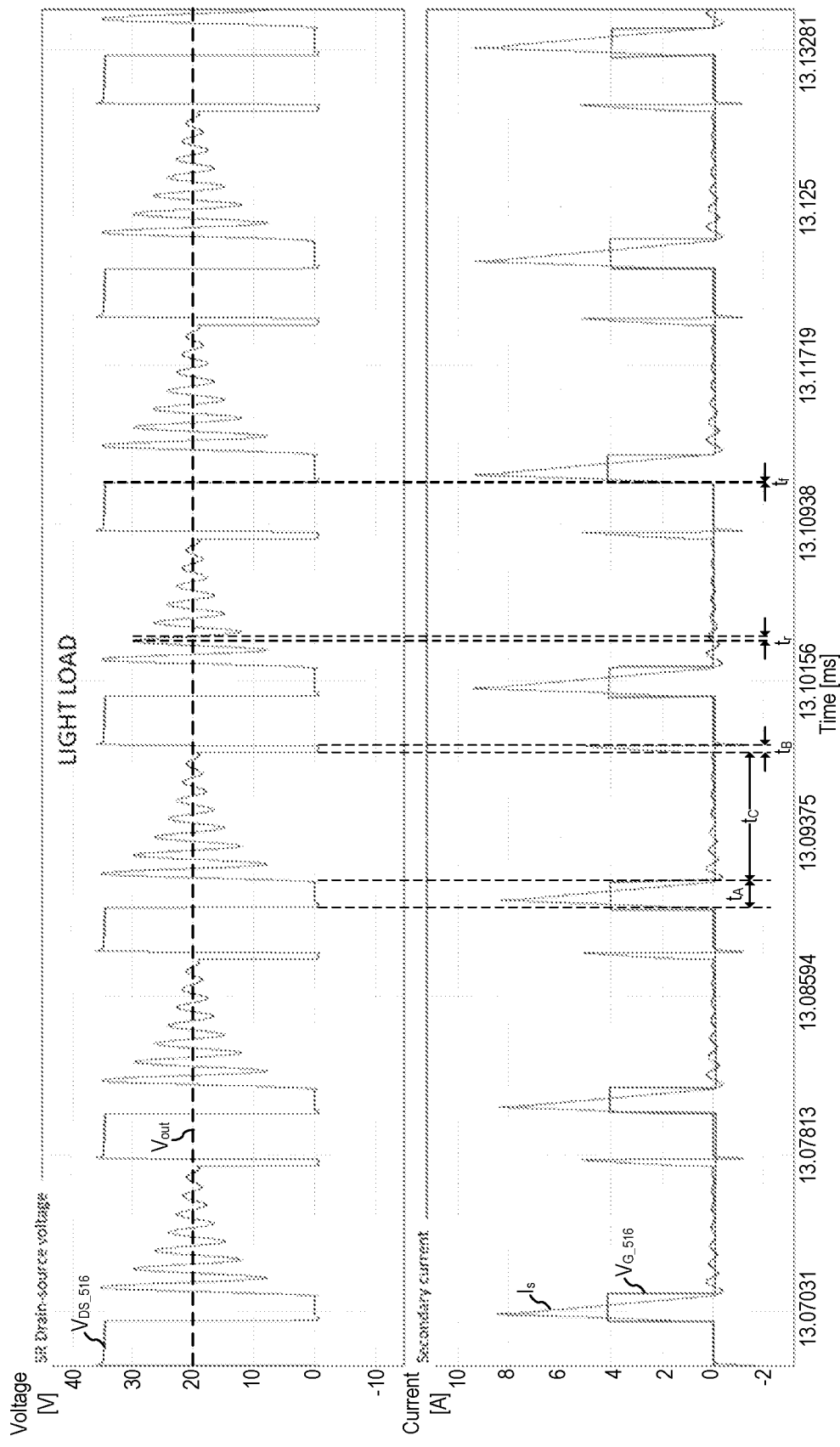

The inventor realized that negative edges of voltage $V_{DS\_516}$ corresponding to period $t_A$ start from a voltage higher than $V_{out}$ while negative edges of voltage $V_{DS\_516}$ corresponding to period $t_B$ start from a voltage lower than or equal to $V_{out}$. For example, FIGS. 6A and 6B show waveforms associated with SR transistor 516 of ACF converter 500, at full load and light load, respectively, according to an embodiment of the present invention. FIGS. 6A and 6B may be understood in view of FIG. 5.

It is understood that FIGS. 6A and 6B illustrate a particular example of an embodiment operating with an output voltage $V_{out}$ of 20 V. Other output voltages, such as lower than 20 V (e.g., 18 V, 13, V, 12 V, 10 V, 5 V, or lower) or higher than 20 V (e.g., 25 V or higher), may also be used.

As shown in FIGS. 6A and 6B, the negative edges of voltage $V_{DS\_516}$ corresponding to period $t_A$ (when transistor 516 is turned on) start from a voltage ($V_{peak}$) that is higher than the output voltage $V_{out}$. For example, in some embodiments, voltage $V_{peak}$ may be given by $$V_{peak} = V_{out} + \frac{V_{in}}{n} \qquad (1)$$

where n represents the turns ratio of transformer 512.

The negative edges of voltage $V_{DS\_516}$ corresponding to period $t_B$ (when secondary current $I_s$ increases but transistor 516 remains turned off) start from a voltage that is lower than or equal to the output voltage $V_{out}$.

The inventor also realized that the fall time of voltage $V_{DS\_516}$ (illustrated as period $t_f$ in FIG. 6B) corresponding to period $t_A$ (as transistor 502 turns off) is substantially smaller than the time elapsing from a peak of voltage $V_{DS\_516}$ to a crossing of voltage $V_{out}$ during period $t_c$ (illustrated as period $t_r$ in FIG. 6B). Period $t_r$ corresponds to ¼ of the ringing (resonant) period of voltage $V_{DS\_516}$.

In some embodiments, fall time $t_f$ at least one order of magnitude smaller than period $t_r$. For example, in an embodiment, the ringing period of voltage $V_{DS\_516}$ is about 840 ns so that period $t_r$ is about 210 ns, while the fall time $t_f$ is about 20 ns.

In some embodiments, SR transistor 516 is only turned on when the negative edge of voltage $V_{DS\_516}$ starts from a voltage that is higher than $(1+k) \cdot V_{out}$ and crosses output voltage $V_{out}$ faster than a predetermined threshold set between the expected $t_f$ and $t_r$ times. In some embodiments, a gating signal (ON_EN) is use to prevent the turn on of transistor 516 when asserted (e.g., low) and allow the turn on of transistor 516 when deasserted (e.g., high).

Figure 7:
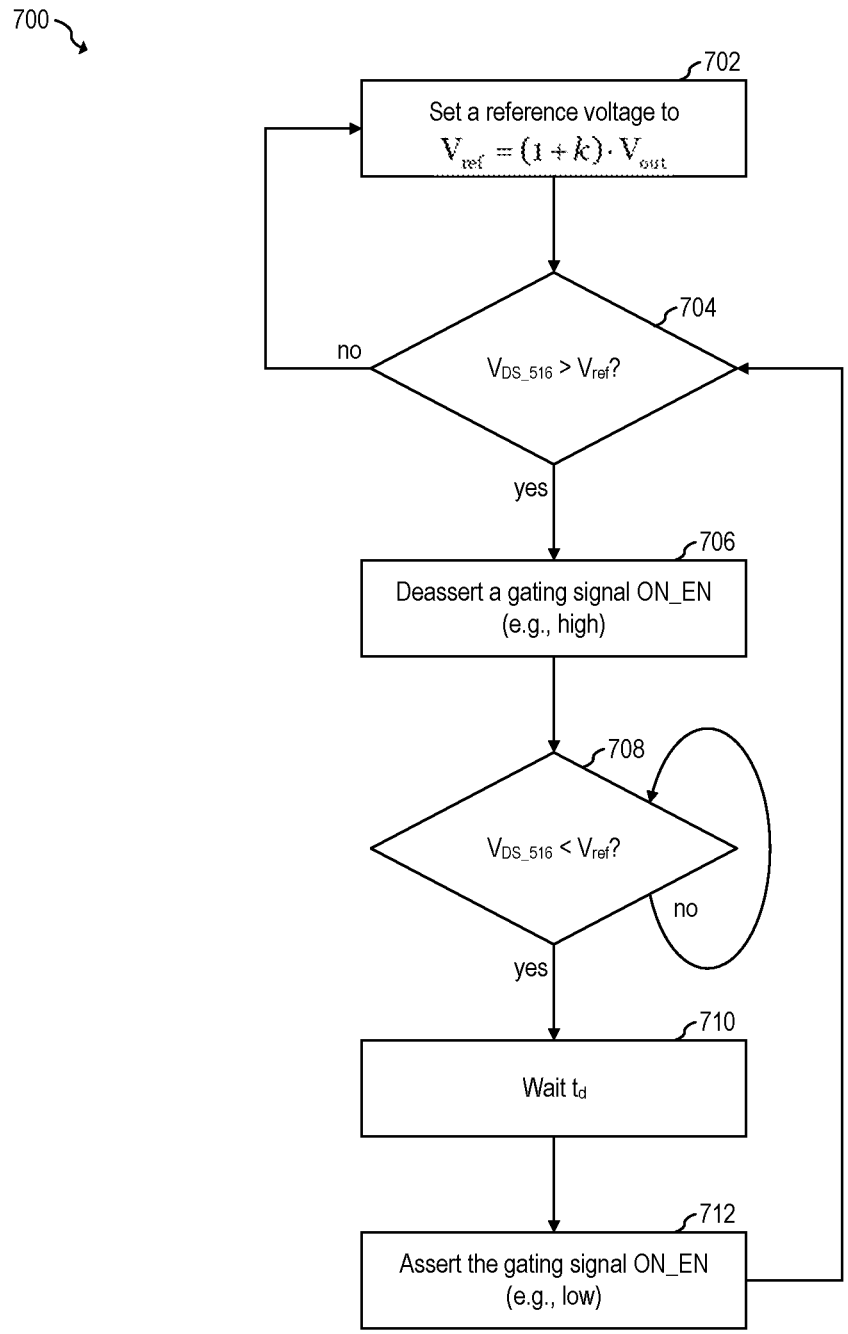
FIG. 7 shows a flow chart of an embodiment method for generating a gating signal for controlling the SR transistor of FIG. 5A, according to an embodiment of the present invention.

FIG. 7 shows a flow chart of embodiment method 700 for generating gating signal ON_EN for controlling SR transistor 516, according to an embodiment of the present invention. Gating signal ON_EN may be used for preventing the turn on of SR transistor 516 when gating signal ON_EN is asserted (e.g., low) and allowing the turn on of SR transistor 516 when gating signal ON_EN is deasserted (e.g., high). In some embodiments, a conventional SR controller may be modified to receive gating signal ON_EN so that the turn on of the SR transistor is prevented when gating signal ON_EN is asserted (e.g., low), while leaving the remainder of the on/off logic of the SR controller unchanged.

During step 702, a reference voltage $V_{ref}$ is generated/set to a value higher than output voltage $V_{out}$. For example, in some embodiments, reference voltage $V_{ref}$ is given by $$V_{ref} = (1+k) \cdot V_{out} \qquad (2)$$

where k is a number higher than 0. For example, in some embodiments, k may have a value between 0.2 and 0.5. In some embodiments, reference voltage $V_{ref}$ may be given by $$V_{ref} = V_{out} + \frac{V_{peak} - V_{out}}{2} \qquad (3)$$

During step 704, the drain-to-source voltage of transistor 516 ($V_{DS\_516}$) is compared with the reference voltage $V_{ref}$. When voltage $V_{DS\_516}$ is higher than reference voltage $V_{ref}$, gating signal ON_EN is deasserted (e.g., high).

After gating signal ON_EN is deasserted (e.g., high), the drain-to-source voltage of transistor 516 ($V_{DS\_516}$) is compared with the reference voltage $V_{ref}$ during step 708. When voltage $V_{DS\_516}$ is lower than reference voltage $V_{ref}$, gating signal ON_EN is asserted (e.g., high) during step 712 after a wait time $t_d$ (during step 710), where the wait time $t_d$ has a duration between the expected fall time duration $t_f$ and the duration of period $t_r$.

In some embodiments, wait time $t_d$ (also referred to as delay time $t_d$) may be, e.g., 100 ns. Other values, such as 90 ns, 80 ns, or lower, or 110 ns, 150 ns, or higher, may also be used. In some embodiments, wait time $t_d$ may be given by $$t_f << t_d << \left(\frac{1}{4} + \frac{k}{2\pi}\right) \cdot t_{ring} \quad (4)$$

where $t_{ring}$ represents the ringing (resonant) period of voltage $V_{DS\_516}$ during time $t_c$.

In some embodiments, the turning on of SR transistor 516 is not gated during period $t_A$, since gating signal ON_EN is deasserted (step 706) for a period $t_d$ that is longer than fall time $t_f$. In some embodiments, the turning on of SR transistor 516 is gated (prevented) during period $t_B$ when operating at full load (e.g., as shown in FIG. 6A) since voltage $V_{DS\_516}$ increases but remains well below output voltage $V_{out}$ (output "no" during step 704). In some embodiments, the turning on of SR transistor 516 is gated (prevented) during the first (or first few) valley of period $t_B$ when operating at light load (e.g., as shown in FIG. 6B) since gating signal ON_EN is asserted (step 712) after period $t_d$ that is shorter than period $t_f$. In some embodiments, the turning on of SR transistor 516 is gated (prevented) after the first (or first few) valley of period $t_B$ when operating at light load (e.g., as shown in FIG. 6B) since voltage $V_{DS\_516}$ remains below output voltage $V_{out}$ (output "no" during step 704).

Figure 8:
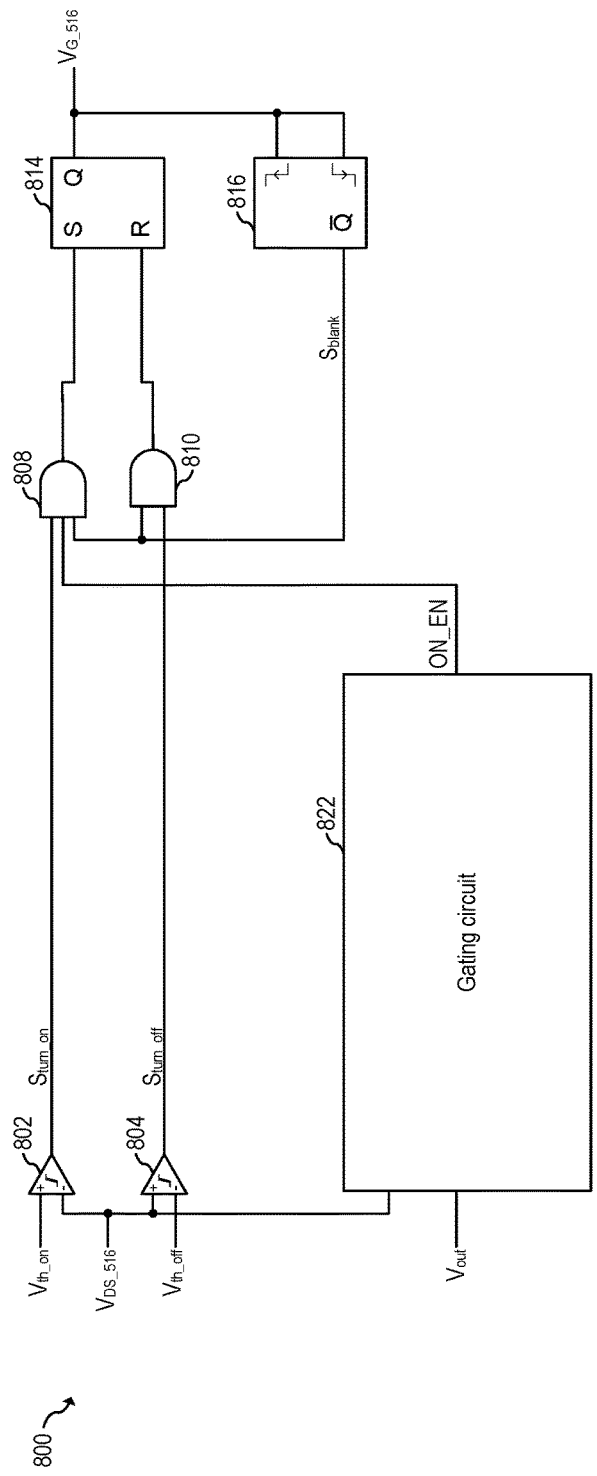
FIG. 8 shows a schematic diagram of the SR controller of FIG. 5A, according to an embodiment of the present invention.

FIG. 8 shows a schematic diagram of SR controller 800, according to an embodiment of the present invention. SR controller 800 includes comparators 802, and 804, AND gates 808 and 810, flip-flops 814 and blanking circuit 816, and gating circuit 822. SR controller 518 may be implemented as SR controller 800.

Comparator 802 is configured to detect when the body diode of transistor 516 is conducting (thereby detecting that secondary current $I_s$ is greater than zero). The output signal $S_{turn\_on}$ of comparator 802 is asserted (high) when voltage $V_{DS\_516}$ drops below threshold voltage $V_{th\_on}$. In some embodiments, threshold voltage $V_{th\_on}$ is, e.g., −0.3 V, for example. Other threshold voltages may also be used.

Comparator 804 is configured to detect when secondary current $I_s$ drops to zero. In some embodiments, such detection is implemented based on the rdson of transistor 516, which operates as a current sensor for sensing secondary current $I_s$. For example, in some embodiments, signal $S_{turn\_off}$ is asserted (high) when voltage $V_{DS\_516}$ exceeds threshold voltage $V_{th\_off}$. In some embodiments, threshold voltage $V_{th\_off}$ is about 0 V, such as 0.5 mV, for example. Other threshold voltages may also be used.

Gating circuit 822 is configured to generate gating signal ON_EN based on output voltage $V_{out}$ and voltage $V_{DS\_516}$. For example, in some embodiments, gating circuit 822 generates gating signal ON_EN in accordance with method 700.

Blanking circuit 816 is configured to be triggered by a rising edge as well as by a falling edge of voltage $V_{G\_516}$ (i.e., each time there is a change of state in voltage $V_{G\_516}$). Blanking circuit 816 is configured to produce (each time blanking circuit 816 is triggered) a negative pulse with a duration $t_{d1}$ (also referred to as blanking time, or $t_{blank}$) to prevent AND gates 808 and 810 from asserting during period $t_{d1}$. In some embodiments, period tai is, e.g., 300 ns. Other values for $t_{d1}$ may also be used. In some embodiments, blanking circuit 816 may be implemented in any way known in the art.

As shown in FIG. 8, during normal operation, signal $S_{turn\_on}$ is asserted (e.g., high) when the body diode of transistor 516 is conducting. However, flip-flop 814 is only set if signal $S_{turn\_on}$ is asserted when gating signal ON_EN is deasserted (e.g., high) and blanking signal $S_{blank}$ is deasserted (e.g., high).

Signal $S_{turn\_off}$ is asserted (e.g., high) when secondary current $I_s$ drops to zero. However, flip-flop 814 is only reset if signal $S_{turn\_off}$ is asserted when blanking signal $S_{blank}$ is deasserted (e.g., high).

In some embodiments, comparators 802, and 804 may be implemented in any way known in the art. For example, in some embodiments, e.g., as illustrated in FIG. 8, comparators 802 and 804 may be implemented with hysteresis.

In some embodiments, flip flop 814 is configured to be set (high) based on the output of AND gate 808 and be reset (low) based on the output of AND gate 81o. Flip-flop 814 may be implemented in any way known in the art.

Figure 9B:
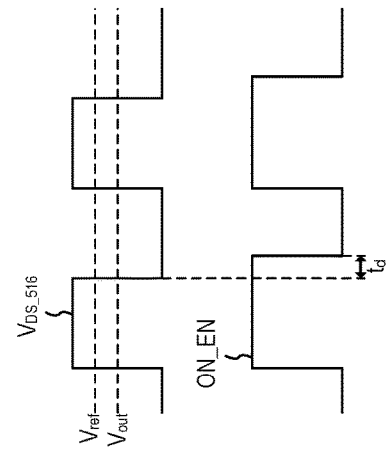
FIGS. 9A and 9B show a schematic diagram of the gating circuit of FIG. 8, and associated waveforms, respectively, according to an embodiment of the present invention.
Figure 9A:
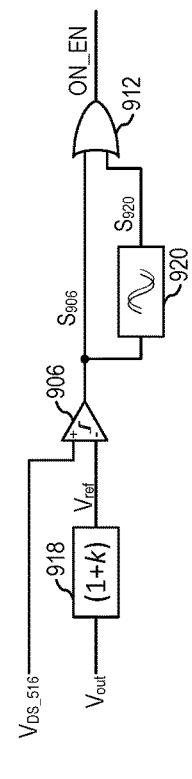

FIGS. 9A and 9B show a schematic diagram of gating circuit 900, and associated waveforms, respectively, according to an embodiment of the present invention. Gating circuit 900 includes comparator 906, OR gate 912, multiplier 918, and delay circuit 920. Gating circuit 822 may be implemented as gating circuit 900.

In some embodiments, multiplier 918 is configured to multiply output voltage $V_{out}$ times $(1+k)$ to generate (e.g., step 702) reference voltage $V_{ref}$ (e.g., according to Equation 2). Multiplier 918 may be implemented in any way known in the art, such as with an analog amplifier. In some embodiments, reference voltage $V_{ref}$ may be generated in other ways, such as in accordance with Equation 3.

In some embodiments, comparator 906 compares (e.g., step 704) voltage $V_{ref}$ and $V_{D\_516}$ and asserts signal $S_{906}$ when voltage $V_{DS\_516}$ is higher than voltage $V_{ref}$. Comparator 906 may be implemented in any way known in the art. For example, in some embodiments, e.g., as illustrated in FIG. 9A, comparator 906 may be implemented with hysteresis.

In some embodiments, delay circuit 920 is configured to delay signal $S_{906}$ by a time $t_d$, where $t_d$ is given, e.g., by Equation 4. Thus signal $S_{920}$ asserts (high) $t_d$ time after signal $S_{906}$ asserts (high) and deasserts (low) $t_d$ time after signal $S_{916}$ deasserts (low). In some embodiments, delay circuit 920 may be implemented in any way known in the art.

As can be seen in FIG. 9A, delay circuit 920 and OR gate 912 perform steps 706, 708, 710, and 712. For example, gating signal ON_EN is deasserted (high) when signal $S_{906}$ is asserted (high) and gating signal ON_EN is kept deasserted (high) for a duration $t_d$ after signal $S_{906}$ is deasserted (low), as shown in FIG. 9B.

Figure 10:
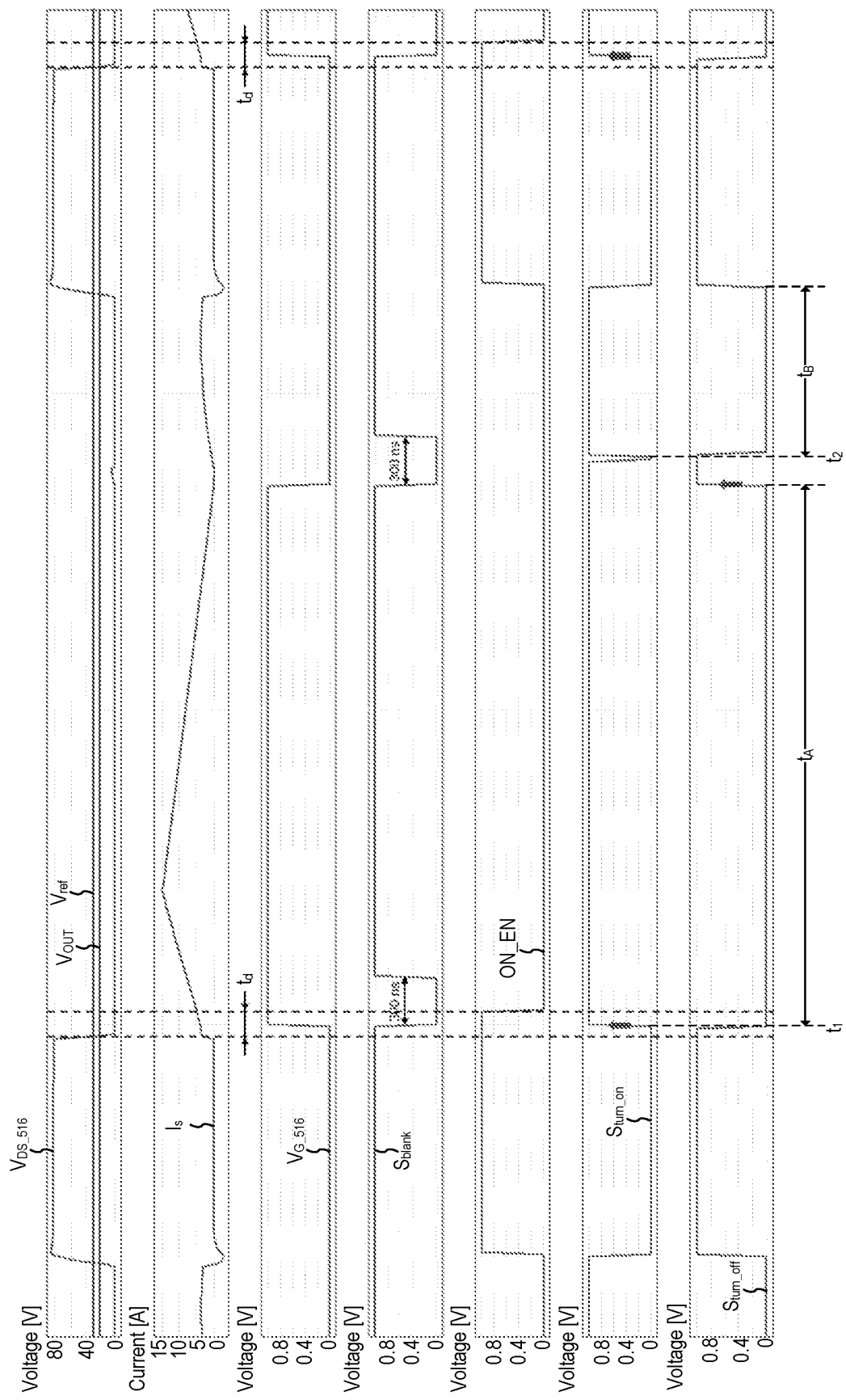
FIGS. 10 and 11 show waveforms associated with the SR controller of FIG. 8 and operating at full load and light load, respectively, according to an embodiment of the present invention.
Figure 11:
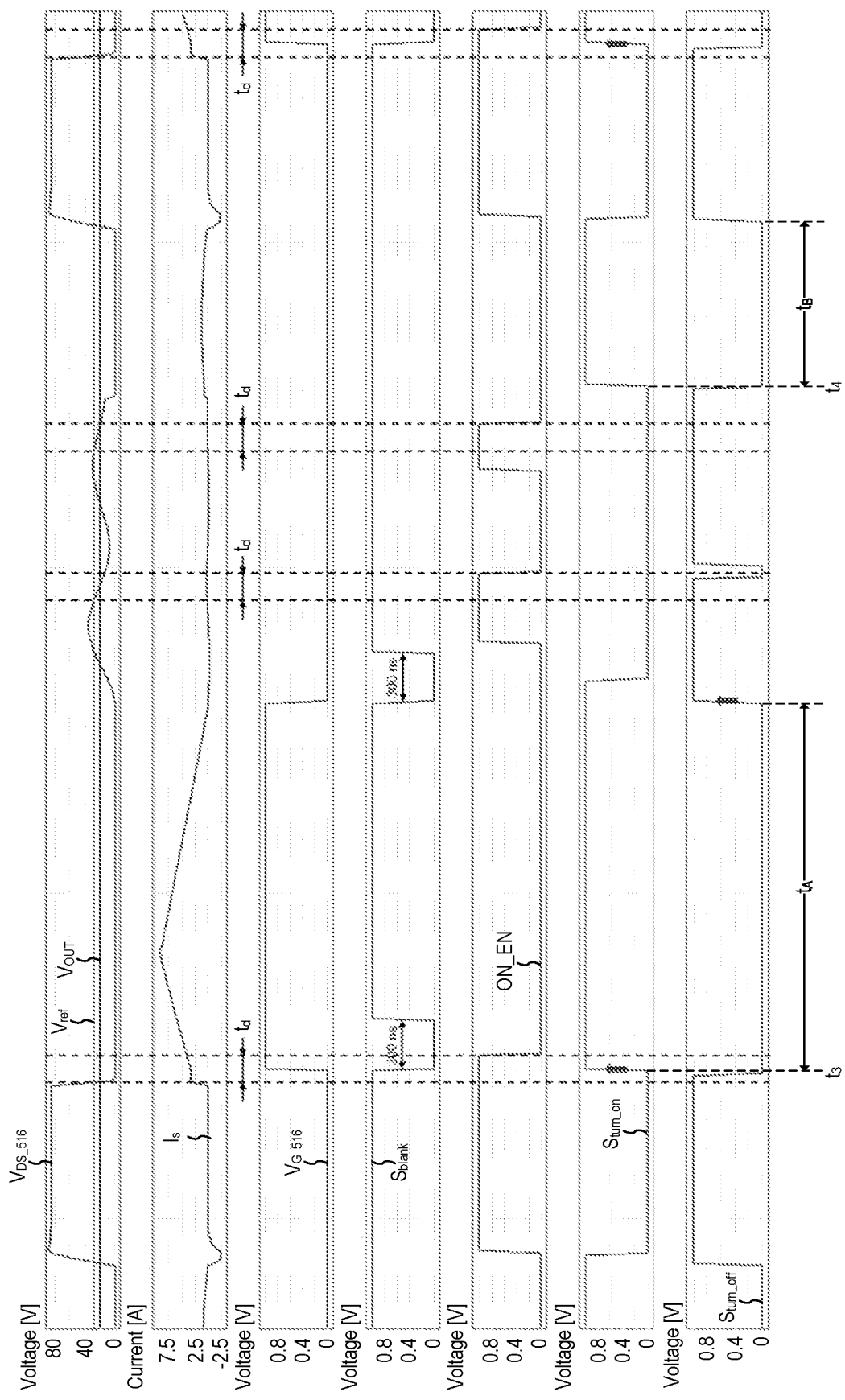

FIGS. 10 and 11 show waveforms associated with SR controller 800 implementing gating circuit 822 as gating circuit 900 and operating at full load and light load, respectively, according to an embodiment of the present invention. In the embodiment shown in FIGS. 10 and 11, converter 500 is operated as a non-complementary ACF converter, output voltage $V_{out}$ is 20 V, blanking time $t_{blank}$ is 300 ns, and k is 0.4 so that $V_{ref}$=1.4V. FIGS. 10 and 11 also illustrate the time window $t_d$ that begins when voltage $V_{DS\_516}$ crosses output voltage $V_{out}$ from a voltage higher than $V_{ref}$.

As shown in FIG. 10, at time $t_1$ (at the beginning of period $t_A$) gating signal ON_EN is high (since it is within delay time $t_d$) and blanking signal $S_{blank}$ is high (since there has not been a state transition of voltage $V_{G\_516}$ during the 300 ns immediately prior to time $t_1$). Since signals ON_EN and $S_{blank}$ are both high, signal $S_{turn\_on}$ propagate via AND gate 808 to flip-flop 814 to cause voltage $V_{G\_516}$ to transition from low to high, thus turning on SR transistor 516. Thus SR transistor 516 is on during period $t_A$.

As shown in FIG. 10, at time $t_2$, gating signal ON_EN is low (since voltage $V_{DS\_516}$ has not increased above voltage $V_{ref}$) and blanking time is low (since voltage $V_{G\_516}$ transitioned from high to low less than 300 ns prior to time $t_2$). Since both blanking signal $S_{blank}$ and gating signal ON_EN are low, signal $S_{turn\_on}$ is prevented from propagating to flip-flop 814, and thus SR transistor 516 to remain off during period $t_B$.

As shown in FIG. 11, at time $t_3$ (at the beginning of period $t_A$) gating signal ON_EN is high (since it is within delay time $t_d$) and blanking signal $S_{blank}$ is high (since there has not been a state transition of voltage $V_{G\_516}$ during the 300 ns immediately prior to time $t_1$). Since signals ON_EN and $S_{blank}$ are both high, signal $S_{turn\_on}$ propagate via AND gate 808 to flip-flop 814 to cause voltage $V_{G\_516}$ to transition from low to high, thus turning on SR transistor 516. Thus SR transistor 516 is on during period $t_A$.

As shown in FIG. 11, at time $t_4$, gating signal ON_EN is low (since, even though voltage $V_{DS\_516}$ increased above voltage $V_{ref}$, time $t_4$ occurs more than $t_d$ time after voltage $V_{DS\_516}$ crosses output voltage $V_{out}$) and blanking time is high (since there has not been a state transition of voltage $V_{G\_516}$ during the 300 ns immediately prior to time $t_1$). Since gating signal ON_EN is low, signal $S_{turn\_on}$ is prevented from propagating to flip-flop 814, and thus SR transistor 516 to remain off during period $t_B$.

Figure 12A:
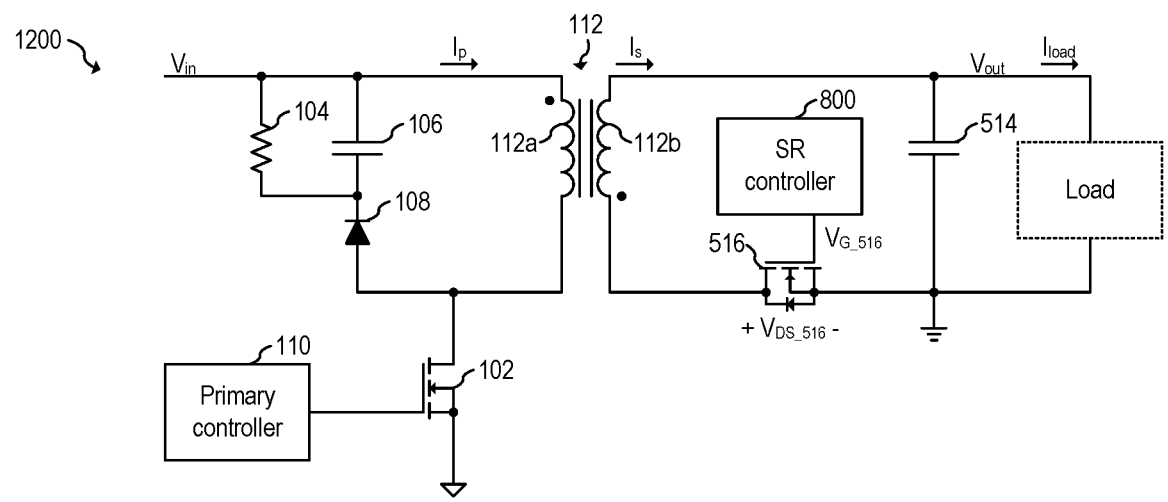
FIGS. 12A and 12B show a schematic diagram of a flyback converter, and associated waveforms, respectively, according to an embodiment of the present invention.
Figure 12B:
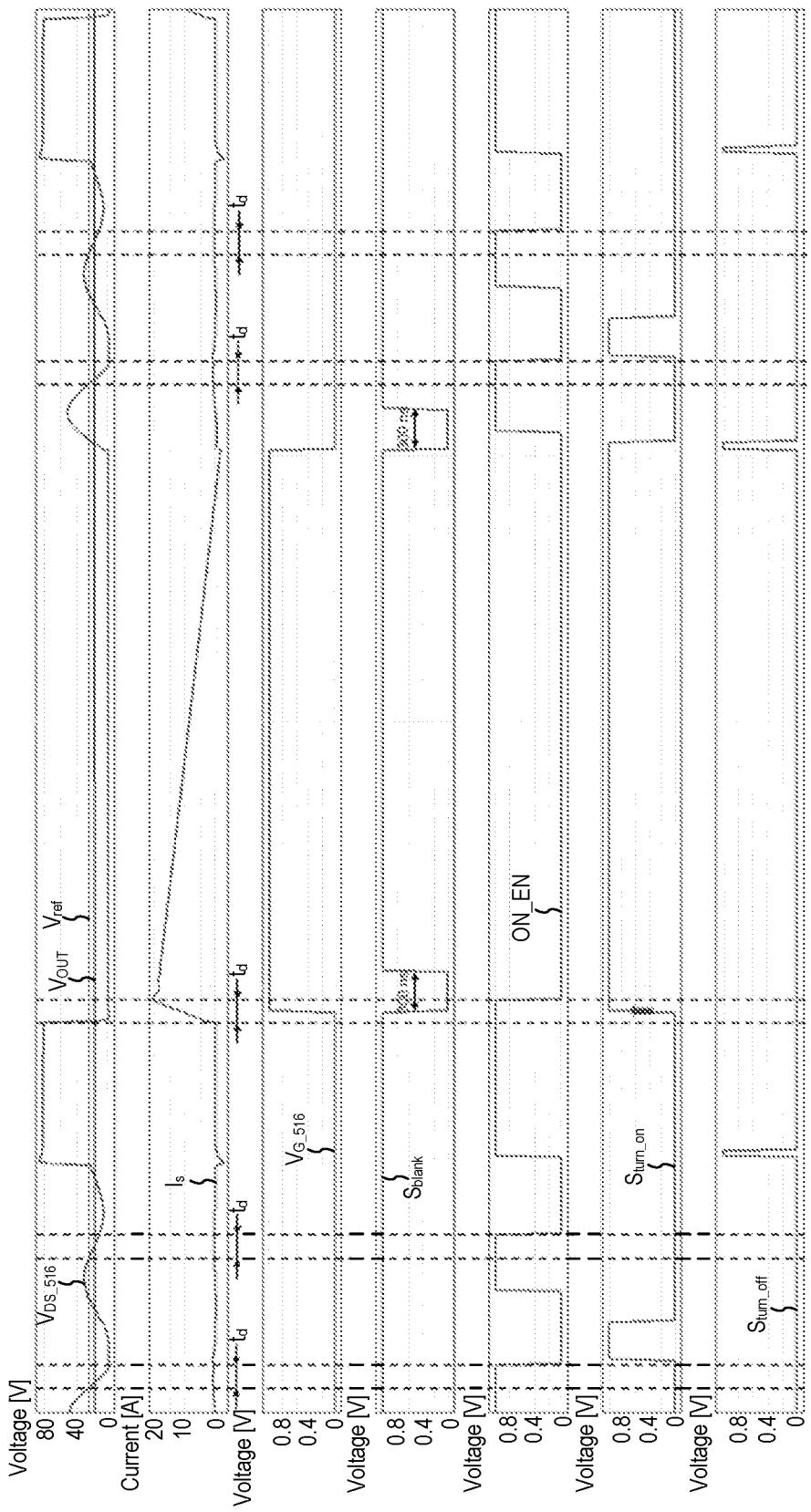

In some embodiments, SR controller 800 may be advantageously used (e.g., without change) in other types of flyback topologies. For example, FIGS. 12A and 12B show a schematic diagram of flyback converter 1200, and associated waveforms, respectively, according to an embodiment of the present invention. Flyback converter 1200 is an RCD clamp flyback converter that implements SR transistor 516 and controls the SR transistor 516 with SR controller 800 implementing gating circuit 822 as gating circuit 900.

The waveforms illustrated in FIGS. 12B, are associated with flyback converter 1200 being operated in DCM mode, with an output voltage $V_{out}$ of 20 V, a blanking time $t_{blank}$ of 300 ns, and k equal to 0.4 so that $V_{ref}=1.4V_{out}$. As shown in FIG. 12B, SR controller 800 causes transistor 516 to turn on and off at the expected times for proper DCM operation.

Example embodiments of the present invention are summarized here. Other embodiments can also be understood from the entirety of the specification and the claims filed herein.

Example 1. A method for controlling a synchronous rectifier (SR) transistor of a flyback converter, the method including: determining a first voltage across conduction terminals of the SR transistor; asserting a turn-on signal when a body diode of the SR transistor is conducting current; asserting a turn-off signal when current flowing through the conduction terminals of the SR transistor decreases below a first threshold; generating a gating signal based on an output voltage of the flyback converter and on the first voltage; turning on the SR transistor based on the turn-on signal and on the gating signal; and turning off the SR transistor based on the turn-off signal.

Example 2. The method of example 1, where generating the gating signal includes: determining a reference voltage based on the output voltage; when the first voltage increases above the reference voltage, deasserting the gating signal; and while the gating signal is deasserted, comparing the first voltage with the reference voltage and asserting the gating signal a first delay time after the first voltage drops below the reference voltage.

Example 3. The method of one of examples 1 or 2, where turning on the SR transistor includes turning on the SR transistor when the turn-on signal is asserted while the gating signal is deasserted.

Example 4. The method of one of examples 1 to 3, where the first delay time is lower than one quarter of a ringing time of the first voltage.

Example 5. The method of one of examples 1 to 4, where the first delay time is between 20 ns and 210 ns.

Example 6. The method of one of examples 1 to 5, where the reference voltage is given by $v_{ref}=(1+k)\cdot V_{out}$, where $V_{ref}$ represents the reference voltage, $V_{out}$ represents the output voltage, and k is a number higher than 0.

Example 7. The method of one of examples 1 to 6, where k is between 0.2 and 0.5.

Example 8. The method of one of examples 1 to 7, where generating the gating signal includes using a gating circuit that includes: a first comparator having a first input for receiving the first voltage and a second input for receiving the reference voltage; a delay circuit having an input coupled to an output of the first comparator, the delay circuit having a delay time equal to the first delay time; and an OR gate having a first input coupled to the output of the first comparator, a second input coupled to an output of the delay circuit, and an output for providing the gating signal.

Example 9. The method of one of examples 1 to 8, further including generating a blanking signal based on the first voltage, where turning on the SR transistor is further based on the blanking signal, and where turning off the SR transistor is further based on the blanking signal.

Example 10. The method of one of examples 1 to 9, where asserting the turn-on signal includes asserting the turn-on signal when the first voltage drops below a second threshold, and where asserting the turn-off signal includes asserting the turn-off signal when the first voltage increases above a third threshold.

Example 11. The method of one of examples 1 to 10, further including operating the flyback converter as a non-complementary active clamp flyback (ACF) converter.

Example 12. The method of one of examples 1 to 11, further including operating the flyback converter as an RCD clamp flyback converter in discontinuous conduction mode (DCM).

Example 13. A synchronous rectifier (SR) controller including: an output terminal configured to be coupled to a control terminal of an SR transistor of a flyback converter; and an input terminal configured to receive an output voltage of the flyback converter, where the SR controller is configured to: determine a first voltage across conduction terminals of the SR transistor; assert a turn-on signal when a body diode of the SR transistor is conducting current; assert a turn-off signal when current flowing through the conduction terminals of the SR transistor decreases below a first threshold; generate a gating signal based on the output voltage of the flyback converter and on the first voltage; turn on the SR transistor based on the turn-on signal and on the gating signal; and turn off the SR transistor based on the turn-off signal.

Example 14. The SR controller of example 13, where the SR controller is configured to generate the gating signal by: determining a reference voltage based on the output voltage; when the first voltage increases above the reference voltage, deasserting the gating signal; and while the gating signal is deasserted, comparing the first voltage with the reference voltage and asserting the gating signal a first delay time after the first voltage drops below the reference voltage.

Example 15. The SR controller of one of examples 13 or 14, where the SR controller is configured to turn on the SR transistor when the turn-on signal is asserted while the gating signal is deasserted.

Example 16. The SR controller of one of examples 13 to 15, further including a gating circuit configured to generate the gating signal, the gating circuit including: a first comparator having a first input configured to receive the first voltage and a second input configured to receive the reference voltage; a delay circuit having an input coupled to an output of the first comparator, the delay circuit having a delay time equal to the first delay time; and an OR gate having a first input coupled to the output of the first comparator, a second input coupled to an output of the delay circuit, and an output configured to provide the gating signal.

Example 17. The SR controller of one of examples 13 to 16, further including; a turn on circuit configured to generate the turn-on signal; a turn-off circuit configured to generate the turn-off signal; a first AND gate having a first input coupled to an output of the turn on circuit, and a second input coupled to an output of the OR gate; and a first flip-flop having a first input coupled to an output of the first AND gate, a second input coupled to an output of the turn-off circuit, and an output coupled to the output terminal.

Example 18. The SR controller of one of examples 13 to 17, further including: a blanking circuit having an input couple to the output of the first flip-flop; and a second AND gate having a first input coupled to an output of the blanking circuit, a second input coupled to the output of the turn-off circuit, and an output coupled to the second input of the first flip-flop, where the first AND gate includes a third input coupled to the output of the blanking circuit.

Example 19. The SR controller of one of examples 13 to 18, where the turn on circuit includes a second comparator having a first input configured to receive a second threshold, and a second input configured to receive the first voltage; and where the turn off circuit includes a third comparator having a first input configured to receive a third threshold, and a second input configured to receive the first voltage.

Example 20. A flyback converter including: a transformer having first and second windings; an output terminal coupled to the second winding; a first primary transistor coupled to the first winding; a primary controller having an output coupled to a control terminal of the first primary transistor; a synchronous rectifier (SR) transistor coupled to the second winding; and an SR controller configured to: determine a first voltage across conduction terminals of the SR transistor, assert a turn-on signal when a body diode of the SR transistor is conducting current, assert a turn-off signal when current flowing through the conduction terminals of the SR transistor decreases below a first threshold, generate a gating signal based on an output voltage at the output terminal and on the first voltage; turn on the SR transistor based on the turn-on signal and on the gating signal; and turn off the SR transistor based on the turn-off signal.

Example 21. The flyback converter of example 20, further including a second primary transistor coupled to the second winding, where the primary controller is configured to control the first and second primary transistor to operate the flyback converter as a non-complementary active clamp flyback (ACF) converter.

Example 22. The flyback converter of one of examples 20 or 21, further including a resistor coupled to the first winding, a capacitor coupled in parallel with the resistor, and a diode coupled between the first primary transistor and the capacitor, where the primary controller is configured to control the first primary transistor to operate the flyback converter as an RCD clamp flyback converter in discontinuous conduction mode (DCM).

Example 23. The flyback converter of one of examples 20 to 22, where the SR transistor is a metal-oxide semiconductor field-effect transistor (MOSFET) or GaN transistor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling a synchronous rectifier (SR) transistor of a flyback converter, the method comprising:
   determining a first voltage across conduction terminals of the SR transistor;
   asserting a turn-on signal when a body diode of the SR transistor is conducting current;
   asserting a turn-off signal when current flowing through the conduction terminals of the SR transistor decreases below a first threshold;
   generating a gating signal based on an output voltage of the flyback converter and on the first voltage, wherein generating the gating signal comprises:
      determining a reference voltage based on the output voltage;
      when the first voltage increases above the reference voltage, deasserting the gating signal; and
      while the gating signal is deasserted, comparing the first voltage with the reference voltage and asserting the gating signal a first delay time after the first voltage drops below the reference voltage;
   turning on the SR transistor based on the turn-on signal and on the gating signal; and
   turning off the SR transistor based on the turn-off signal.

2. The method of claim 1, wherein turning on the SR transistor comprises turning on the SR transistor when the turn-on signal is asserted while the gating signal is deasserted.

3. The method of claim 1, wherein the first delay time is lower than one quarter of a ringing time of the first voltage.

4. The method of claim 1, wherein the first delay time is between 20 ns and 210 ns.

5. The method of claim 1, wherein the reference voltage is given by $V_{ref}=(1+k)\cdot V_{out}$, where $V_{ref}$ represents the reference voltage, $V_{out}$ represents the output voltage, and k is a number higher than 0.

6. The method of claim 5, wherein k is between 0.2 and 0.5.

7. The method of claim 1, wherein generating the gating signal comprises using a gating circuit that comprises:
   a first comparator having a first input for receiving the first voltage and a second input for receiving the reference voltage;
   a delay circuit having an input coupled to an output of the first comparator, the delay circuit having a delay time equal to the first delay time; and an OR gate having a first input coupled to the output of the first comparator, a second input coupled to an output of the delay circuit, and an output for providing the gating signal.

8. The method of claim 1, further comprising generating a blanking signal based on the first voltage, wherein turning on the SR transistor is further based on the blanking signal, and wherein turning off the SR transistor is further based on the blanking signal.

9. The method of claim 1, wherein asserting the turn-on signal comprises asserting the turn-on signal when the first voltage drops below a second threshold, and wherein asserting the turn-off signal comprises asserting the turn-off signal when the first voltage increases above a third threshold.

10. The method of claim 1, further comprising operating the flyback converter as a non-complementary active clamp flyback (ACF) converter.

11. The method of claim 1, further comprising operating the flyback converter as an RCD clamp flyback converter in discontinuous conduction mode (DCM).

12. A synchronous rectifier (SR) controller comprising:
an output terminal configured to be coupled to a control terminal of an SR transistor of a flyback converter; and
an input terminal configured to receive an output voltage of the flyback converter, wherein the SR controller is configured to:
determine a first voltage across conduction terminals of the SR transistor;
assert a turn-on signal when a body diode of the SR transistor is conducting current;
assert a turn-off signal when current flowing through the conduction terminals of the SR transistor decreases below a first threshold;
generate a gating signal based on the output voltage of the flyback converter and on the first voltage, wherein the SR controller is configured to generate the gating signal by:
determining a reference voltage based on the output voltage,
when the first voltage increases above the reference voltage, deasserting the gating signal, and
while the gating signal is deasserted, comparing the first voltage with the reference voltage and asserting the gating signal a first delay time after the first voltage drops below the reference voltage;
turn on the SR transistor based on the turn-on signal and on the gating signal; and
turn off the SR transistor based on the turn-off signal.

13. The SR controller of claim 12, wherein the SR controller is configured to turn on the SR transistor when the turn-on signal is asserted while the gating signal is deasserted.

14. The SR controller of claim 12, further comprising a gating circuit configured to generate the gating signal, the gating circuit comprising:
a first comparator having a first input configured to receive the first voltage and a second input configured to receive the reference voltage;
a delay circuit having an input coupled to an output of the first comparator, the delay circuit having a delay time equal to the first delay time; and
an OR gate having a first input coupled to the output of the first comparator, a second input coupled to an output of the delay circuit, and an output configured to provide the gating signal.

15. The SR controller of claim 14, further comprising:
a turn on circuit configured to generate the turn-on signal;
a turn-off circuit configured to generate the turn-off signal;
a first AND gate having a first input coupled to an output of the turn on circuit, and a second input coupled to an output of the OR gate; and
a first flip-flop having a first input coupled to an output of the first AND gate, a second input coupled to an output of the turn-off circuit, and an output coupled to the output terminal.

16. The SR controller of claim 15, further comprising:
a blanking circuit having an input couple to the output of the first flip-flop; and
a second AND gate having a first input coupled to an output of the blanking circuit, a second input coupled to the output of the turn-off circuit, and an output coupled to the second input of the first flip-flop, wherein the first AND gate comprises a third input coupled to the output of the blanking circuit.

17. The SR controller of claim 15, wherein the turn on circuit comprises a second comparator having a first input configured to receive a second threshold, and a second input configured to receive the first voltage; and wherein the turn off circuit comprises a third comparator having a first input configured to receive a third threshold, and a second input configured to receive the first voltage.

18. A flyback converter comprising:
a transformer having a first winding and a second winding;
an output terminal coupled to the second winding;
a first primary transistor coupled to the first winding;
a primary controller having an output coupled to a control terminal of the first primary transistor;
a synchronous rectifier (SR) transistor coupled to the second winding; and
an SR controller configured to:
determine a first voltage across conduction terminals of the SR transistor,
assert a turn-on signal when a body diode of the SR transistor is conducting current,
assert a turn-off signal when current flowing through the conduction terminals of the SR transistor decreases below a first threshold,
generate a gating signal based on an output voltage at the output terminal and on the first voltage, wherein the SR controller is configured to generate the gating signal by being configured to:
determine a reference voltage based on the output voltage,
when the first voltage increases above the reference voltage, deassert the gating signal, and
while the gating signal is deasserted, compare the first voltage with the reference voltage and assert the gating signal a first delay time after the first voltage drops below the reference voltage;
turn on the SR transistor based on the turn-on signal and on the gating signal; and
turn off the SR transistor based on the turn-off signal.

19. The flyback converter of claim 18, further comprising a second primary transistor coupled to the first winding, wherein the primary controller is configured to control the first and second primary transistor to operate the flyback converter as a non-complementary active clamp flyback (ACF) converter.

20. The flyback converter of claim 18, further comprising a resistor coupled to the first winding, a capacitor coupled in parallel with the resistor, and a diode coupled between the first primary transistor and the capacitor, wherein the primary controller is configured to control the first primary transistor to operate the flyback converter as an RCD clamp flyback converter in discontinuous conduction mode (DCM).

21. The flyback converter of claim 18, wherein the SR transistor is a metal-oxide semiconductor field-effect transistor (MOSFET) or GaN transistor.

* * * * *

UNITED STATES PATENT AND TRADEMARK OFFICE
CERTIFICATE OF CORRECTION

| | |
|---|---|
| PATENT NO. | : 12,040,722 B2 |
| APPLICATION NO. | : 17/523561 |
| DATED | : July 16, 2024 |
| INVENTOR(S) | : Claudio Adragna |

It is certified that error appears in the above-identified patent and that said Letters Patent is hereby corrected as shown below:

In the Claims

In Column 12, in Claim 5, Line 57, delete "than o." and insert -- than 0. --.

Signed and Sealed this
Twenty-fourth Day of September, 2024

*Katherine Kelly Vidal*

Katherine Kelly Vidal
*Director of the United States Patent and Trademark Office*